R. D. NORTON.
Pulverizing Disk Harrow.
No. 9,676. Reissued April 19, 1881.
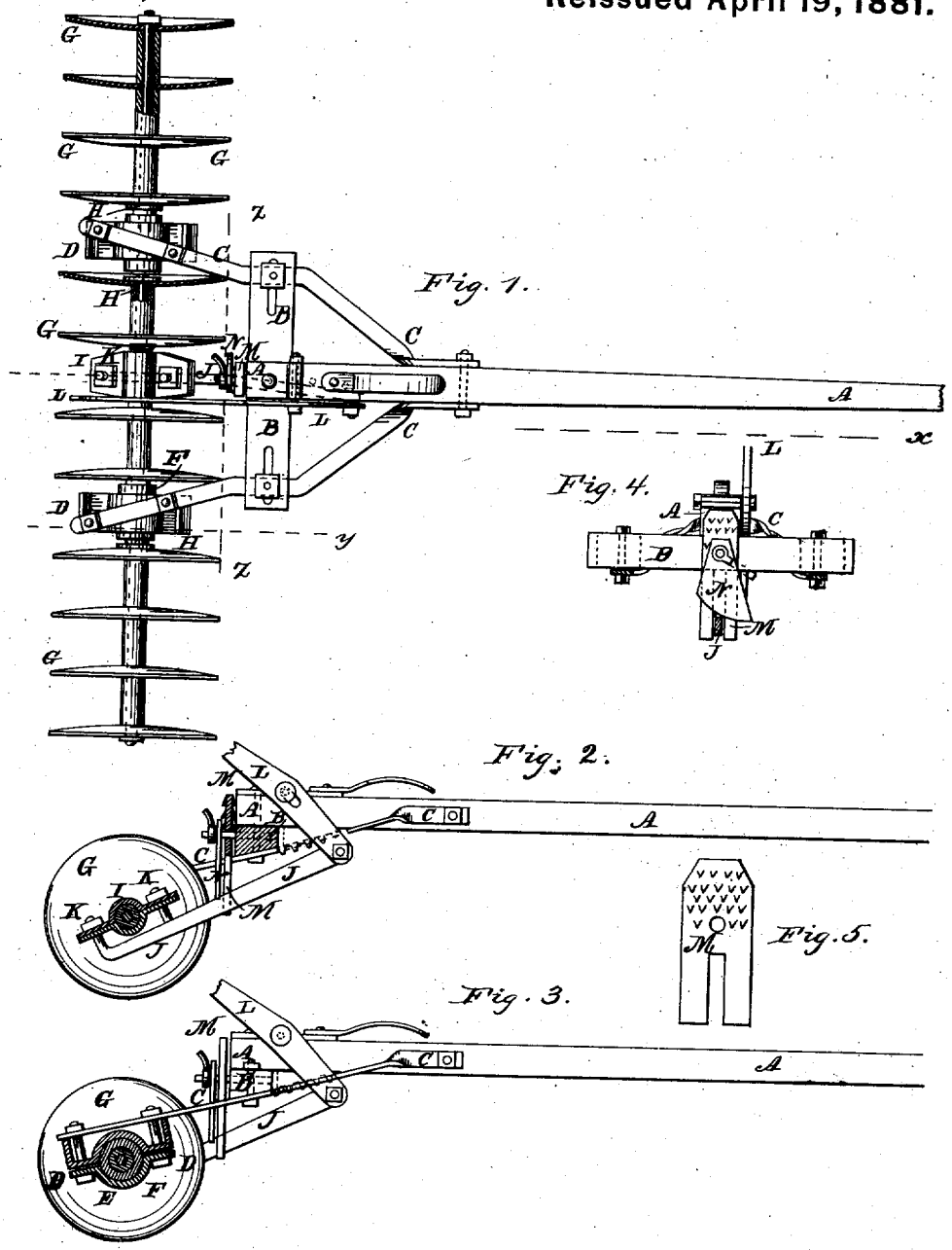
Witnesses:
H. N. Low
J. S. Barker
Inventor:
Richard D. Norton
by W. W. Doubleday
H. W. Bliss atty's

UNITED STATES PATENT OFFICE.

RICHARD D. NORTON, OF HIGHTSTOWN, NEW JERSEY.

PULVERIZING DISK-HARROW.

SPECIFICATION forming part of Reissued Letters Patent No. 9,676, dated April 19, 1881.

Original No. 214,180, dated April 8, 1879. Application for reissue filed May 17, 1880.

*To all whom it may concern:*

Be it known that I, RICHARD D. NORTON, of Hightstown, in the county of Mercer and State of New Jersey, have invented certain new and useful Improvements in Pulverizing Disk-Harrows; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1 is a top view of the harrow, partly in section, to show the construction. Fig. 2 is a side view of the same, partly in section, through the line *x x*, Fig. 1. Fig. 3 is a side view of the same, partly in section, through the line *y y*, Fig. 1. Fig. 4 is a cross-section of the same, taken through the line *z z*, Fig. 1. Fig. 5 is a detail view of the slotted button.

Similar letters of reference indicate corresponding parts.

The object of this invention is to improve the construction of the pulverizing disk-harrow in such a way that it may be more easily held and controlled, and at the same time may be more durable and effective.

The invention consists in a double bearing combined with a bar secured at the rear end by two bolts, and pivoted to the lower end of a hand-lever, and also in the combination of a cam and slotted button with a flattened holding-bar, all as hereinafter described.

A represents the tongue, to which the draft is applied.

To the lower side of the rear end of the tongue A is attached a cross-bar, B, the outer ends of which are slotted to receive the bolts by which the bars C are secured to them. The forward ends of the bars C are bolted to the opposite sides of the tongue A, and their rear ends are bolted to the bearings D, in which the shafts E revolve, a bushing, F, being placed upon the said shafts, within the bearings D, to receive the wear.

Upon the shafts E, between the ends of the bearings D and the disks G, are placed washers H, to lessen the friction and prevent the said disks from being worn by the said ends of the bearings.

The inner ends of the shafts E are pivoted to a bearing, I, with ball-and-socket joints, so that the two shafts E may be adjusted in line or at an angle with each other, as may be desired.

The double bearing I is held in place by a bar, J, the rear end of which is secured to it by two bolts, K, which pass through the said bearing, and are formed upon or are attached to the said bar J.

The forward end of the holding-bar J is pivoted to the lower end of a lever, L, which is pivoted to the tongue A. The lever L is held in any position into which it may be adjusted by a projection attached to it, and which engages with the notched edge of a plate attached to the tongue.

The holding-bar J is made flat vertically, and passes through a slot in the button M, which is bolted to the cross-bar B at the rear of the tongue A.

The two bolts K cause the bar J to hold the bearing I firmly and keep it securely in place. The slotted button M holds the bar J from turning and twisting, and thus causes the harrow to work more satisfactorily.

N is a cam-button, which is placed upon the bolt that secures the slotted button M, and is clamped against the said button by the nut of the said bolt.

By this construction, by adjusting the cam-button N, the rise of the holding-bar J and of the middle part of the harrow may be limited to any desired point.

It will be readily understood by all who are familiar with the operation of this class of harrows that the resistance encountered by the outer end of one of the disk-shafts E relative to the resistance in the line of draft encountered by the outer end of the opposite disk-shaft is constantly varying, and that consequently there is a tendency to advance the inner end of one or the other of these shafts relative to the inner end of the other of the shafts, and a consequent tendency to advance one side of the bearing I relative to the other side of said bearing, and thus disturb the proper working relation of the ball-and-socket joints formed by said bearing and the inner ends of the disk-shafts; and it is also apparent that by attaching the holding-bar J to the bearing I at two points—that is to say, by means of two bolts, K—the bearing is readily kept in a proper working position relative to both shafts, whereas if the holding-bar were attached to the bearing by a single bolt a slight looseness of said bolt would permit a pivotal movement of the bearing upon said bolt whenever the resistance or backward strain upon the outer end of one disk-shaft should be greater than the backward strain upon the outer end of the other shaft.

I am aware that the bearing in which the inner ends of the disk-gangs are mounted has been connected with the main frame by means of a draw-bar pivoted to the main frame and attached at its rear end to the bearing at two points; but in such earlier construction the connection between the draw-bar and the bearing was a single bolt, which served as a pivot whenever the nut on said bolt became a little loose. In fact, it has been found impracticable, in ordinary use, to prevent the bearing from vibrating about said bolt as a pivot, the result being a rapid and objectionable wearing of parts, as harrows have been heretofore constructed, whereas in my construction no looseness of parts which is liable to occur in ordinary use will permit the bearing I to assume an improper working position relative to the gang-shafts.

Having thus described my invention, what I claim is—

1. The combination, in a wheel-harrow, of disk-gangs flexibly connected at their inner ends to a bearing, I, a main frame, and a draw-bar flexibly connected at its front end to the main frame, and having its rear end inflexibly attached to the bearing I, substantially as set forth.

2. The combination, with the main frame, consisting of the tongue A and the cross-bar B, of the holding or draw bar J, the slotted button M, and the disk-gangs, substantially as and for the purposes set forth.

3. The combination of the cam-button N with the slotted button M and the flattened holding-bar J, substantially as herein shown and described.

4. The combination, substantially as set forth, of a main frame, disk-gangs flexibly connected at their inner ends, and also connected to the main frame, a lever, a bar connecting the lever and the flexible connection, and a button or guide-plate in which said bar works.

In testimony that I claim the foregoing I have hereunto set my hand this 28th day of April, 1880.

RICHARD D. NORTON.

Witnesses:
CHARLES TAPPAN,
H. H. DOUBLEDAY.